June 10, 1958
P. REKETTYE
2,838,024
APPARATUS FOR SPRAY COATING BALLS
Filed July 5, 1955
6 Sheets-Sheet 1
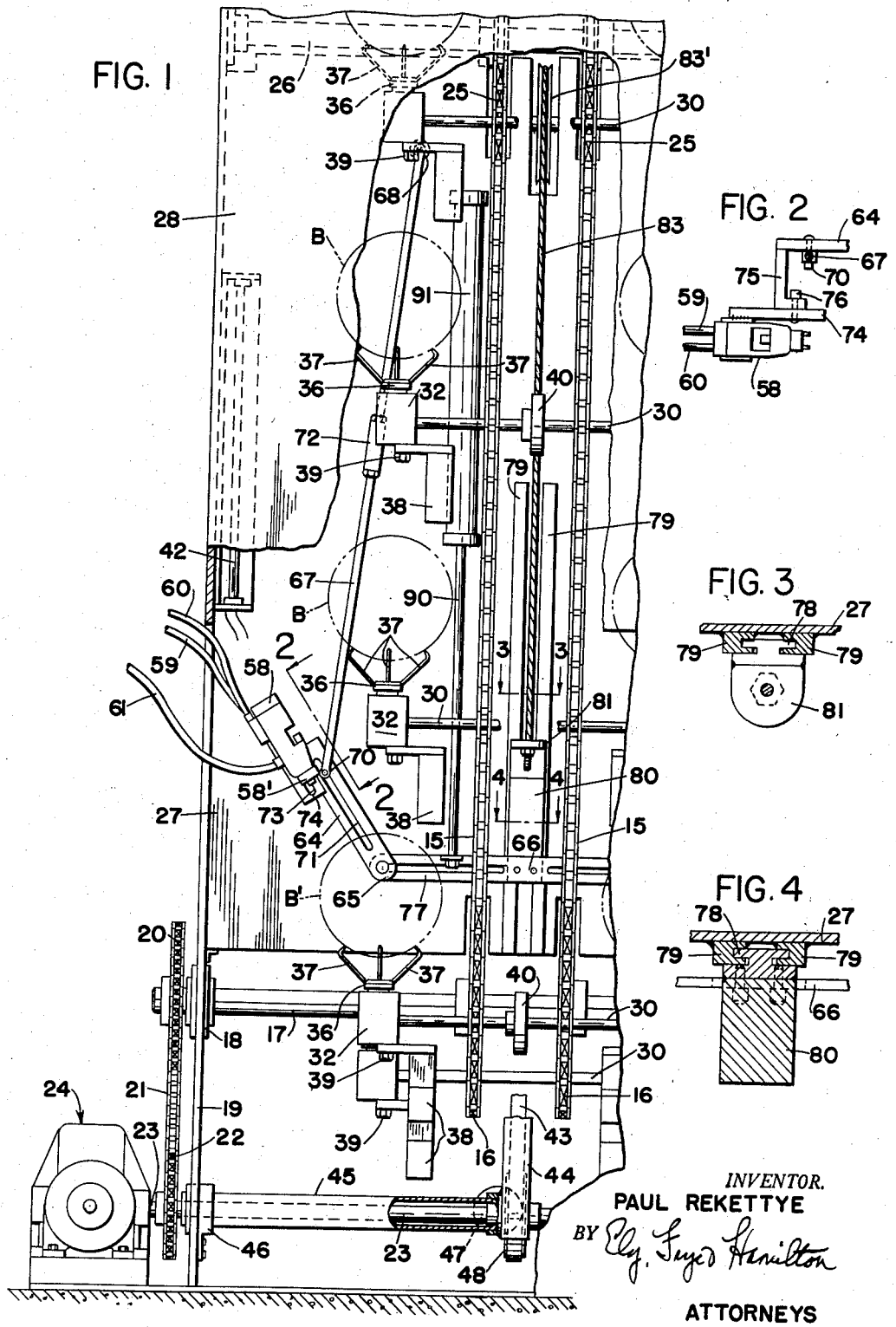
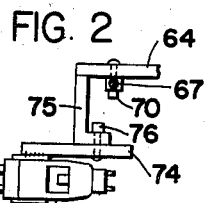
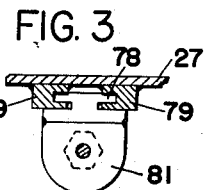
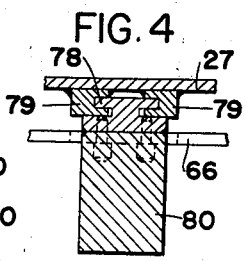
INVENTOR.
PAUL REKETTYE
BY
ATTORNEYS

INVENTOR.
PAUL REKETTYE
BY
ATTORNEYS

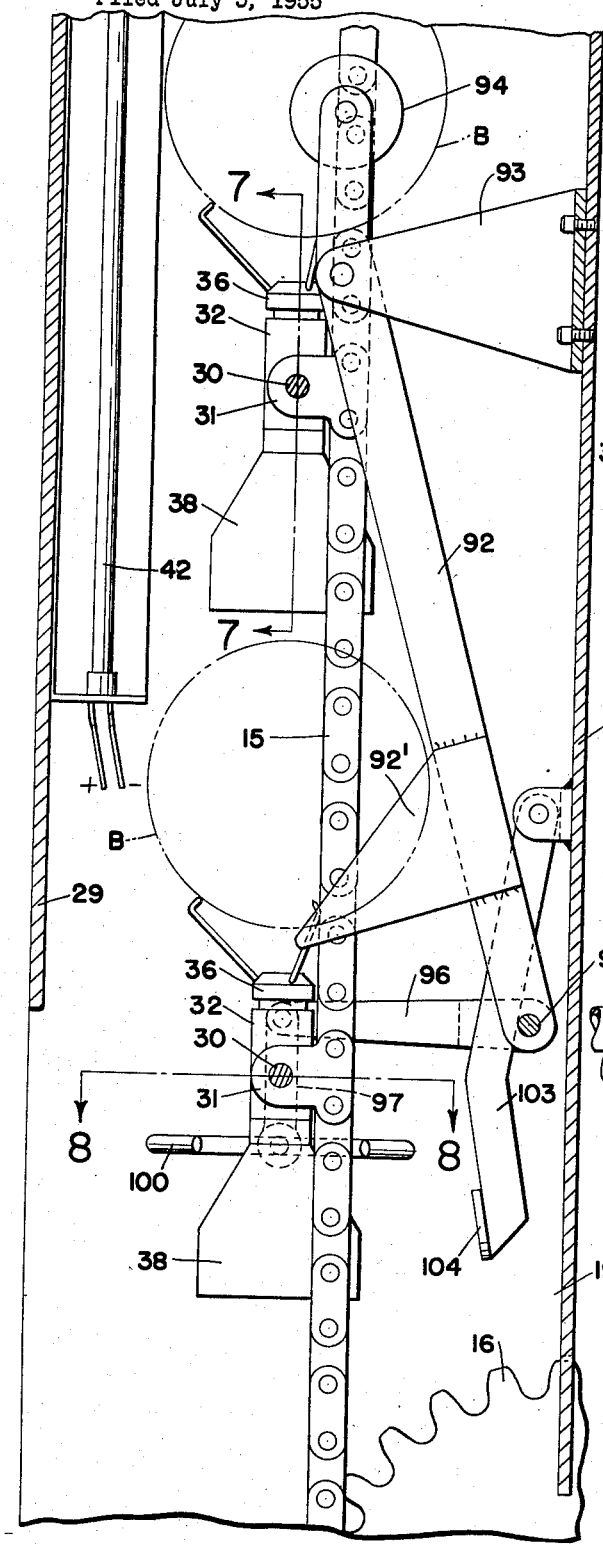
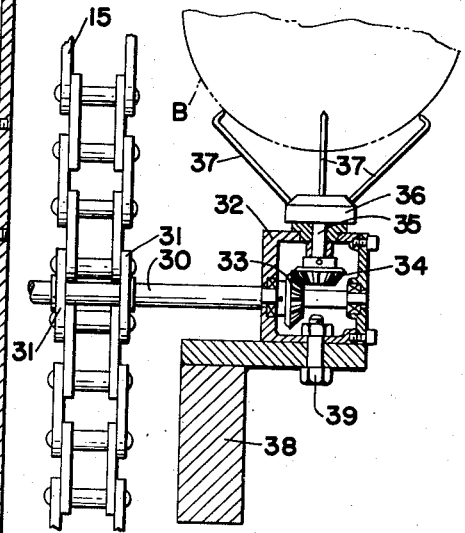
FIG. 7
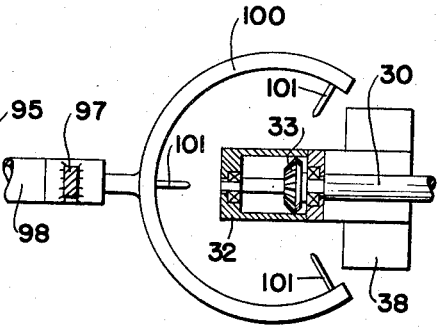
FIG. 8
FIG. 6
INVENTOR.
PAUL REKETTYE
BY Ely, Fryed Hamilton
ATTORNEYS

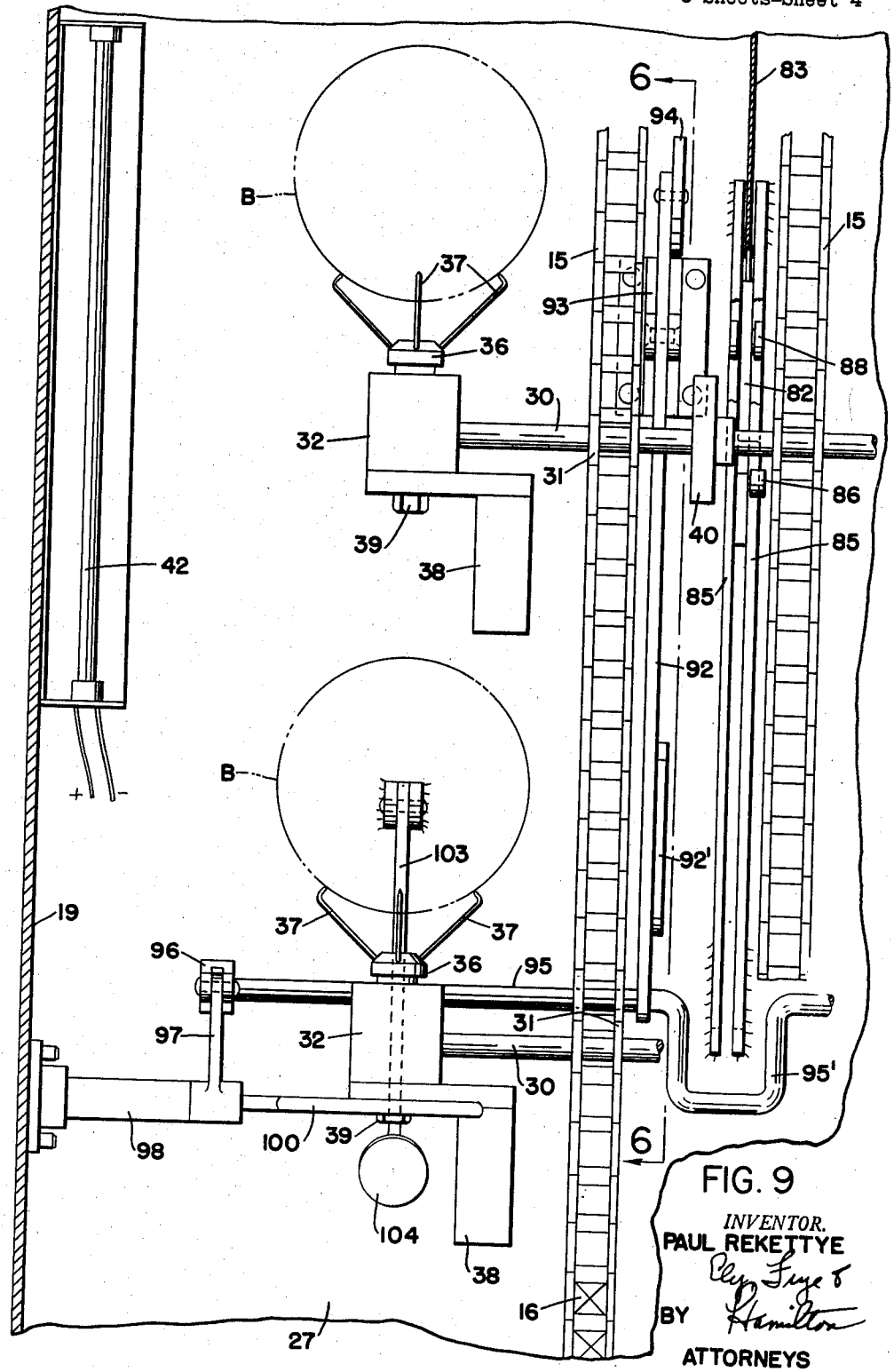

June 10, 1958 P. REKETTYE 2,838,024
APPARATUS FOR SPRAY COATING BALLS
Filed July 5, 1955 6 Sheets-Sheet 5

*INVENTOR.*
PAUL REKETTYE
BY Ely, Frye & Hamilton
ATTORNEYS

June 10, 1958 P. REKETTYE 2,838,024
APPARATUS FOR SPRAY COATING BALLS
Filed July 5, 1955 6 Sheets-Sheet 6
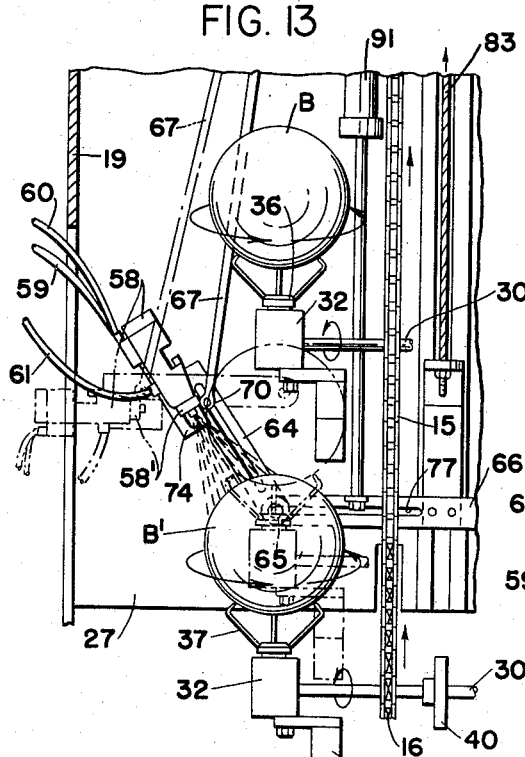
FIG. 13
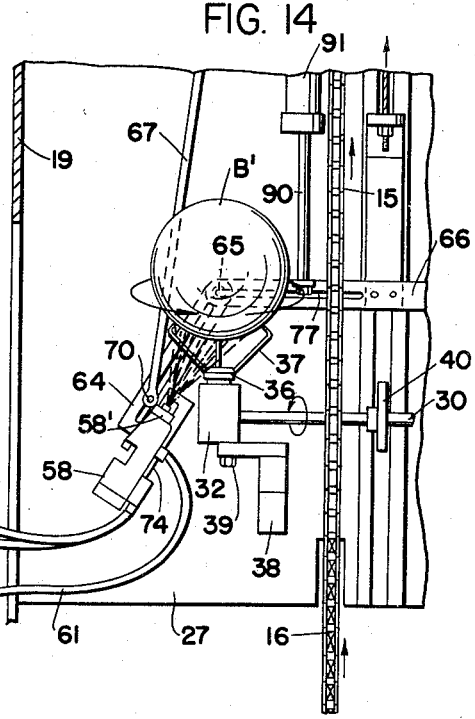
FIG. 14
FIG. 15
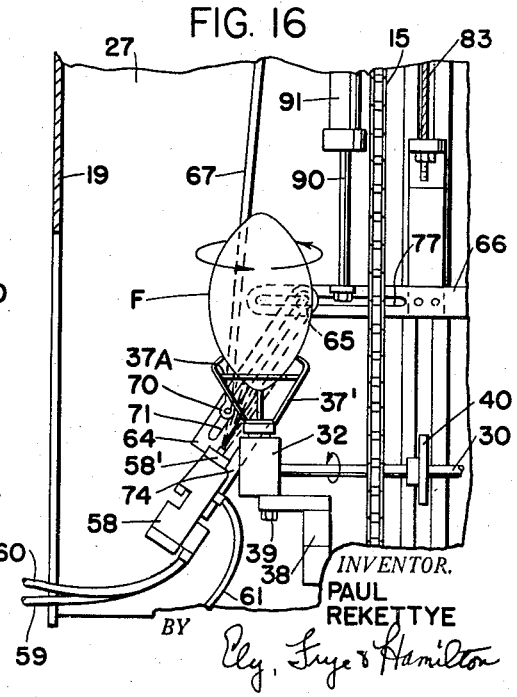
FIG. 16
INVENTOR.
PAUL REKETTYE
BY
ATTORNEYS United States Patent Office 2,838,024
Patented June 10, 1958

2,838,024

APPARATUS FOR SPRAY COATING BALLS

Paul Rekettye, Akron, Ohio, assignor to The Sun Rubber Company, Barberton, Ohio, a corporation of Ohio Application July 5, 1955, Serial No. 519,760

8 Claims. (Cl. 118—321)

The invention relates generally to apparatus for spraying objects carried on a conveyor, and more particularly to apparatus for uniformly spray coating balls of various sizes and shapes.

In the manufacture of balls used for recreation or sports, such as basketballs and footballs, out of rubber or plastic materials, it is highly desirable to apply a non-hardening plastic coating to the exterior of the ball to improve its appearance and improve the feel of the ball for gripping it with the hands, without detracting from its resiliency or bounce. This coating requires heating to dry and set.

The conventional method of applying such a coating is to support the ball on a few points or fingers and apply the spray from a spray gun held in the hand, after which the balls are placed in a drying oven. Such a method is laborious, messy, and time-consuming. Moreover, spray material is wasted because the thickness of the coating is not uniform.

The novel apparatus of the present invention overcomes these disadvantages, and applies a uniformly thin plastic coating to the balls automatically as they move along on a conveyor and then through a drying chamber.

An important object of the invention is to provide a spraying apparatus for spray coating successive balls on a moving conveyor, which apparatus is adapted to spray coat balls of different diameters and shapes, so that round balls and footballs of different sizes can be coated.

Another object is to provide novel means for adjustably controlling the path of the spraying apparatus to cause it to follow the contour of the balls.

A further object is to provide means for automatically rotating each ball on one of its axes as the spray nozzle rotates around the ball on another axis perpendicular to the first.

Another object is to provide novel means for loading balls onto the conveyor and for dumping the coated and dried balls off the conveyor.

These and other objects are accomplished by the compact and inexpensive apparatus comprising the present invention. A preferred embodiment of the apparatus is shown by way of example in the accompanying drawings and described in detail herein. Various modifications and changes in details of construction are included within the scope of the appended claims defining the invention.

In the embodiment of the apparatus disclosed herein, a vertically disposed endless conveyor has transverse shafts journaled at intervals along the conveyor and ball supporting fingers rotatively supporting balls at one or both ends of the shafts. During a portion of its travel the conveyor moves a carriage along with it and a spray gun pivoted on the frame is also pivotally mounted on the carriage at the center of curvature of a ball on the conveyor, so that the gun can swing concentrically of the ball as the carriage moves with the conveyor. This center is adjustable to conform to different curvatures. During the spraying cycle, each ball is rotated on its vertical axis, which is perpendicular to the pivotal axis of the spray gun, by rotating the transverse shaft on which the ball is mounted. After spraying, the carriage returns to move forwardly with the next ball, and the sprayed balls are conveyed through a drying zone and then automatically unloaded. A delivery chute leading to the conveyor has means operated by the conveyor for releasing one ball at a time to roll onto the supporting fingers of successive shafts.

Referring to the drawings:

Fig. 1 is a fragmentary elevation, partly broken away, of the front or entrance side of the machine.

Fig. 2 is a fragmentary elevational view on line 2—2, Fig. 1.

Fig. 3 is a fragmentary plan sectional view on line 3—3, Fig. 1.

Fig. 4 is a fragmentary plan sectional view on line 4—4, Fig. 1.

Fig. 6 is an enlarged fragmentary view similar to Fig. 5, taken on line 6—6 of Fig. 9, showing the dumping or unloading mechanism in normal inoperative position.

Fig. 7 is a fragmentary vertical section on line 7—7 of Fig. 6.

Fig. 8 is a plan sectional view on line 8—8 of Fig. 6.

Fig. 9 is an enlarged fragmentary view of the rear or discharge side of the machine.

Figs. 13 and 14 are fragmentary views similar to Fig. 1, showing relative positions of the spray gun during the operation of spray coating a round ball.

Figs. 15 and 16 are similar views showing relative positions of the spray gun during the operation of spray coating a football of oval shape.

Figure 5:
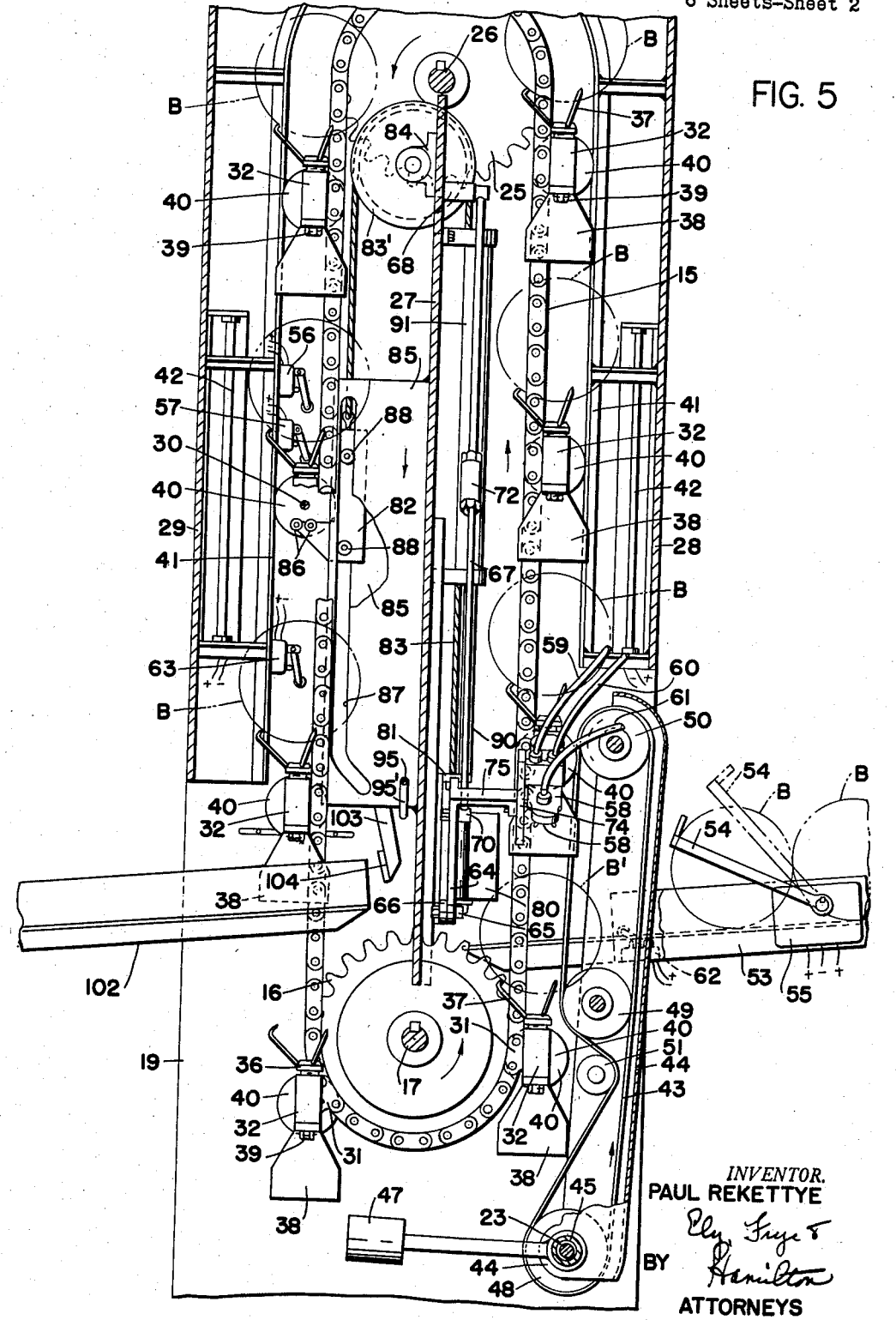
Fig. 5 is a vertical sectional view at right angles to Fig. 1.

Referring to Figs. 1 and 5, the conveyor comprises endless conveyor chains 15, preferably two in number and arranged side-by-side vertically. The chains are driven at their lower ends by sprockets 16 secured on shaft 17, which is journaled at its outer ends in bearings 18 mounted in the side plates 19 of a vertical frame resting on the floor or other suitable support. One end of the shaft 17 is driven by a sprocket 20 connected by a chain 21 to a sprocket 22 on the drive shaft 23 of a motor and gear reducer unit 24.

The upper ends of the chains 15 pass over sprockets 25 secured on an idler shaft 26 journaled in suitable bearings on the side plates 19. A vertical partition plate 27 is supported at its lateral edges on the side plates 19, and extends laterally between the vertical runs of the chains 15 and vertically between the shafts 17 and 26. The upper portion of the conveyor is preferably enclosed in a hood formed by front and rear plates 28 and 29 extending between the side plates and forming a drying chamber.

The conveyor chains 15 carry transverse shafts 30 at longitudinal intervals along the chains, and these shafts are preferably journaled or rotatably mounted on the chain links. The means for supporting the balls to be sprayed are preferably provided at both ends of each shaft, so that two rows of balls are successively sprayed and dried simultaneously, utilizing two spray guns one on each side of the machine. In the drawings only one spray gun and one row of balls is completely shown, as the operation for the other row of balls is a duplication.

As shown in Figs. 6 and 7, the transverse shafts 30 are journaled in the ears of specially formed links 31 provided at proper intervals along the chains 15, so that the shafts pass in front of the front runs of the chains and behind the rear runs. Each shaft carries a gear box 32 on each end, enclosing a bevel gear 33 on the shaft 30 meshing with a bevel gear 34 on a vertical stub shaft 35 projecting from the top of the box. A disk 36, detachably secured on the upper end of stub shaft 35, has three angularly divergent fingers 37 extending upwardly therefrom for supporting the bottom portion of a ball B at three uniformly spaced points with its vertical axis aligned with the axis of stub shaft 35. Thus rotation of shaft 30 will rotate the ball on its vertical axis. For supporting a football, the disk 36 is replaced with one having fingers of different design.

The bottom of each gear box has a counterweight 38 affixed thereto by a bolt 39 to maintain the gear box in upright position to support the ball at all times, especially during that portion of its travel around the upper sprocket 25.

The means for rotating each shaft 30 may comprise a roller 40 fixed on the center of each shaft for engaging a rigid track 41 (Fig. 5) extending parallel to the chains 15 within the hood formed by plates 28 and 29, so that the balls will rotate slowly for uniform drying as they pass through the drying chamber. Electric heating elements 42 are mounted at various locations within the hood to maintain a desired drying temperature. Below front plate 28 of the hood where the spraying is performed, it may be desirable to rotate the balls at a more rapid rate of speed to insure uniform coating. This may be accomplished by a moving belt 43 which contacts the roller 40 of each shaft during the spraying operation.

Referring to Figs. 1 and 5, the belt 43 is mounted within a housing arm 44 pivoted at its lower end for swinging around drive shaft 23 toward the front run of the conveyor chains 15. The arm 44 is carried on an outer sleeve 45 concentric of the shaft and rotatable relative thereto in a bearing 46 on one of the side frame members 19. A counterweight 47 attached to the rear side of the lower end of the arm 44 urges its upper end inwardly toward the conveyor.

The belt 43 is trained around a lower pulley 48 fixed on the shaft 23, and vertically spaced idler pulleys 49 and 50 journaled in the housing arm. A tension roller 51 may be provided below pulley 49 to keep the inner stretch of the belt between pulleys 49 and 50 in a taut condition, and the counterweight 47 holds this stretch of the belt against each successive roller 40 during its upward travel between said pulleys 49 and 50. The drive shaft 23 rotates pulley 48 in a direction to move the inner stretch of the belt downwardly against a roller 40 to speed up the rotation of the ball B on its axis during the spraying operation which occurs while the roller 40 of the shaft carrying the ball is traveling upwardly between pulleys 49 and 50.

As shown in Fig. 5, an entrance chute 53 may be provided at the front side of the machine for feeding balls to the conveyor, and the chute preferably has a latch arm 54 for releasing the balls one at a time in coordination with the conveyor to deposit balls on the successive sets of supporting fingers 37 as they start upwardly from the lower sprocket 16. The latch arm may be raised and lowered by a suitable solenoid device 55 operated by microswitches controlled by the conveyor. In the embodiment shown, the switches are indicated at 56 and 57, and are mounted on the track 41 on the rear side of the conveyor. The roller actuating arms of the switches 56 and 57 are arranged to be contacted by the shafts 30 as they pass downwardly, the switch 56 causing raising of the arm 54 to release a ball B at the proper time to roll onto a set of supporting fingers 37 and switch 57 immediately releasing the arm to drop in front of the next ball. Obviously, the solenoid is adapted to operate two latch arms simultaneously for feeding balls to both sides of the conveyor.

The spray gun 58 is of conventional construction and has hoses 59 and 60 supplying compressed air and coating liquid to the gun chamber. The coating liquid is a plastic coating which stays pliable after setting so as to flex when the ball is bounced, and at the same time improves the appearance as well as the feel of the ball. A conduit 61 carries air operating the valve which controls discharge of coating liquid from the spray nozzle 58'. The valve is opened by actuating a microswitch 62 controlling the air supply, and the switch may be located at the inner end of the delivery chute 53, so that it is tripped by a ball rolling from the chute onto the conveyor. The valve may be closed by actuating a microswitch 63, which may be located on the rear track 41, and arranged to be contacted successively by the shafts 30 as they pass that point.

The spray gun 58 is mounted on an arm 64 which is arranged to swing around each ball as it travels through the spraying zone. The arm 64 is pivoted at one end substantially at the center or axis of curvature of a ball, and the pivotal center 65 is on a supporting bar or carriage 66 which moves along with each ball as it travels through the spraying zone, and then returns to starting position to travel through said zone with the next succeeding ball. The opposite end of arm 64 is pivotally mounted on the frame by a long link 67, the upper end of which is pivoted at 68 on the upper portion of the partition plate 27. The pivotal connection 70 between the lower end of the link and the arm 64 is adjustable longitudinally of the arm in a slot 71. The link is provided with a turnbuckle 72 for adjusting its length.

As shown in Figs. 1 and 2, the spray gun 58 is adjustably mounted on the arm 64 for movement radially of the ball, by providing a slot 73 in the mounting plate 74 parallel with slot 71 in the arm and connecting the bracket 75 on arm 64 to the plate by a bolt 76. The pivotal center 65 is adjustable in a slot 77 in the bar 66 for conforming to the center of an oval ball such as the football F in Figs. 15 and 16.

The supporting bar 66 extends laterally of the conveyor behind the front runs of the conveyor chains 15 and in front of the partition plate 27. As shown in Figs. 3 and 4 the central portion of the bar has an upwardly extending flanged slide portion 78, slidable in a pair of vertical guides 79 on the plate 27. A counterweight 80 preferably extends forwardly from the slide 78, and an angular flange 81 is provided at the top of the slide. The means for causing the bar 66 to travel with the conveyor during the spraying cycle may comprise a releasable device connected to the bar and engaged by the conveyor to be carried along with it for that portion of its travel.

In this embodiment the releasable means comprises a plate 82 slidably mounted on the rear of partition plate 27 and connected to the flange 81 of the front slide 78 by a cable 83 trained over a pulley 83' mounted near the top of plate 27 in suitable bearings 84. The plate 82 slides between guide plates 85 projecting rearwardly from partition plate 27, and has a rearwardly projecting ear carrying rollers 86 normally extending into the path of the transverse shafts 30 below the microswitch 57. As seen in Fig. 5, a descending shaft 30 engages said rollers and moves the plate 82 downwardly with it. This movement is arranged to begin just as the spraying starts with a ball B' in the position shown in Figs. 1 and 5.

The means for releasing the plate 82 to allow the supporting bar to return by gravity to its starting position opposite the next succeeding ball preferably comprises cam slots 87 in the guide plates 85 in which vertically spaced rollers 88 on the plate 82 are engaged. As the lower rollers 88 pass into the lower inclined portions of the cam slots the plate 82 will be tilted about the upper rollers as a center and disengaged from the shaft 30 which has been moving it downward. When the plate 82 is released the weight of the slide 78 and its counterweight 80 will drop the bar 66 to starting position. Referring to Fig. 1, a piston rod 90 is connected at its lower end to bar 66, and has a piston at its upper end working in a dash-pot cylinder 91, to cushion the drop of the bar and counterweight.

Figure 10:
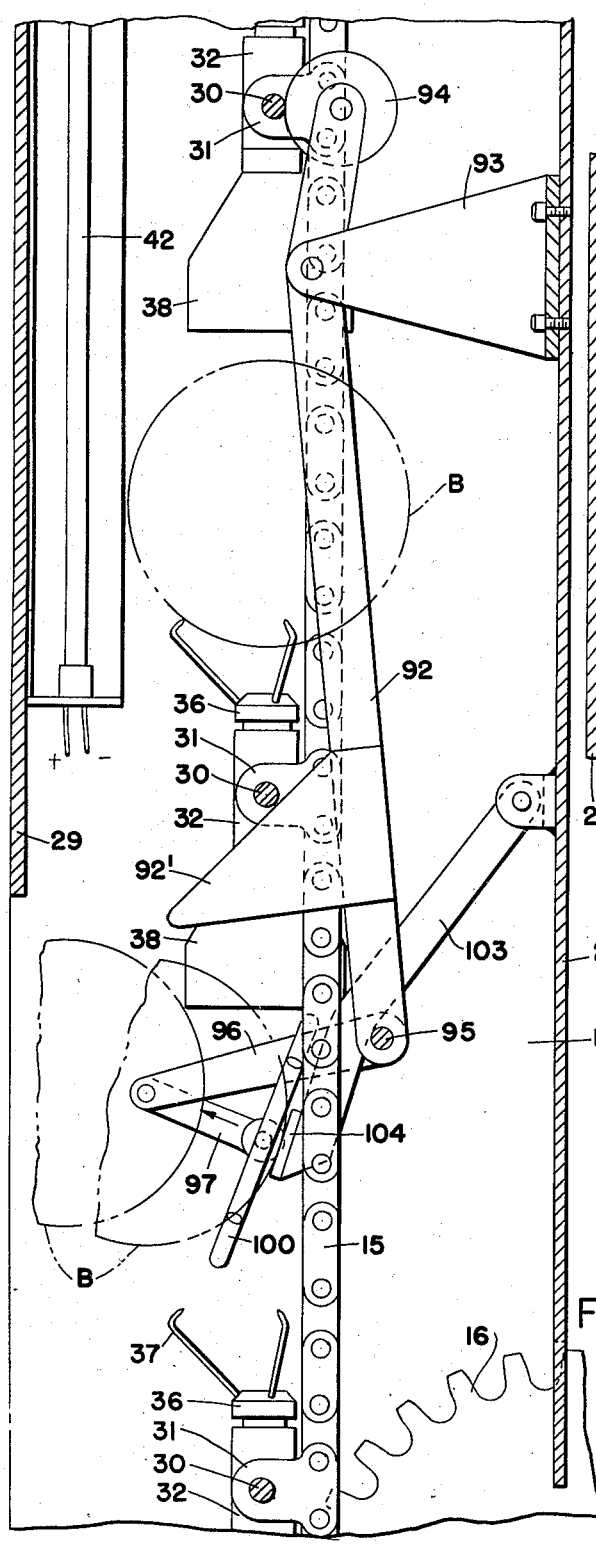
Fig. 10 is a view similar to Fig. 6, showing the unloading mechanism in operative position.
Figure 11:
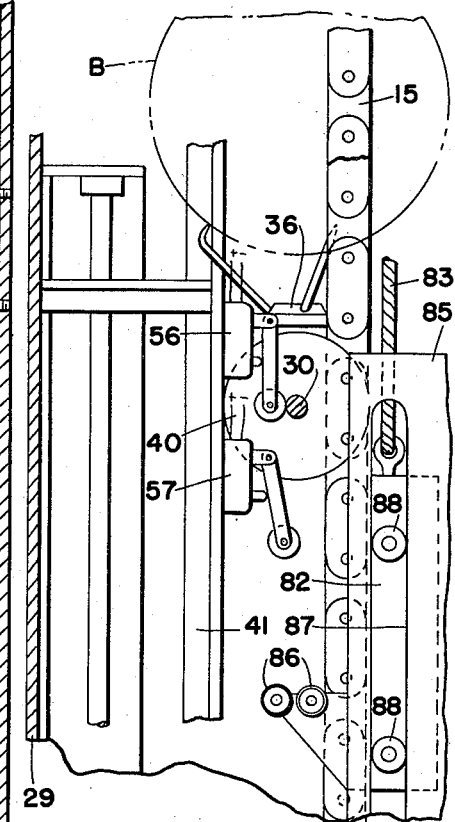
Fig. 11 is a fragmentary view similar to Fig. 5, showing one of the transverse shafts in position to engage the microswitch controlling the ball releasing means at the delivery chute.

The improved mechanism for dumping or unloading the balls from the conveyor, after they have been spray coated and dried by passing through the drying chamber, is best shown in Figs. 6, 9 and 10. A lever arm 92 is pivoted near its upper end on a bracket 93 secured to partition plate 27, and the upper end of arm 92 has a roller 94 thereon with its periphery normally located in the path of the descending shafts 30. The lower end of the arm 92 is journaled on a transverse rod 95 which is offset at its central portion 95' to pass around the lower edges of guide plates 85, and which extends in opposite directions therefrom in front of the rear runs of the chains 15. Near the lower end of arm 92, it is provided with an ear 92' having an inclined cam surface which is contacted by a shaft 30, as shown in Fig. 10, to positively move the roller 94 back into the path of the shafts 30 immediately after a preceding shaft has passed the roller.

At each outer end the rod 95 is pivotally connected to one end of a link 96 which is pivoted at its other end to a lever arm 97 journaled in a bearing 98 on side frame member 19. The lower end of arm 97 has fixed thereto a ring 100 having one side open to allow the gear box 32 and counterweight 38 of each ball support to pass therethrough while inwardly projecting pins 101 on the ring catch and temporarily hold the ball. Thus, after a ball is caught on the pins 101, the engagement of a succeeding shaft 30 with the periphery of roller 94 rocks the lever arm 92 and tilts the ring 100, as shown in Fig. 10, to dump a ball therefrom onto a discharge chute 102, as indicated in Fig. 5.

Preferably, a positive means for pushing a ball off the ring 100 is provided in conjunction with the tilting mechanism, and such a positive means is particularly desirable in the case of footballs such as shown in Figs. 15 and 16, which may not roll off the supporting fingers as readily as round balls. Referring to Figs. 6, 9 and 10, a pushing lever 103 is pivoted at its upper end on plate 27 and extends downwardly behind the rod 95 with a circular push plate 104 on its bottom end normally positioned in the front of the ring 100 as shown in Fig. 6. As the rods 95 moves rearwardly to tilt the ring 100 it engages the lever 103 and move it rearwardly to the position of Fig. 10, where the plate 104 will contact the portion of the ball projecting through the ring and eject it therefrom.

In the operation of the improved machine to coat round balls, the balls are inflated, and then striped or otherwise marked as may be required, and then placed in line on the delivery chute. As the conveyor moves in the direction of the arrows in Fig. 5, a transverse shaft 30 on the rear run trips the microswitches 56 and 57 to raise and lower the latch arm 54 and deliver one ball to the conveyor, and this action is timed so that the ball will roll from the chute onto a set of ball supporting fingers 37 in the position shown at B' in Fig. 5. As the ball leaves the chute it rolls over the actuator arm of switch 62 which causes the spray to start discharging from the nozzle 58' of the spray gun, which is then positioned above and slightly to one side of the ball as shown in Figs. 1 and 13. Due to the divergent angle of the spray, the area covered extends over the top of the ball above its vertical axis.

As seen in Fig. 5, immediately after a shaft 30 has actuated microswitches 56 and 57 to release a ball onto the conveyor and start the spraying operation, the same shaft engages rollers 86 on slide plate 82 and moves it downwardly, thereby starting the transverse bar 66 to move upwardly along with the ball B' which is being sprayed. This movement is timed to start when the center of the ball B' is horizontally aligned with the pivot 65 which mounts the spray gun support arm 64 on the bar 66. As the bar 66 moves upwardly the pivot stays on the horizontal axis of the ball and the gun 58 rotates around that axis on a radius of the ball, the rod 67 providing a swing support for arm 64 as it rotates (as shown in chain lines in Fig. 13), until the gun reaches the position of Fig. 14 where it sprays an area on the underside of the ball covering its vertical axis.

At the start of the spraying operation, the roller 40 of the shaft 30 carrying the ball B' contacts the inner run of belt 43, causing the ball to rotate on its vertical axis, so that the rotation of the gun from its upper to its lower position results in uniformly coating the entire surface of the ball. When the spray gun has reached the position of Fig. 14, the rear slide plate 82 is tilted by the cam slot 87, disengaging the plate from the shaft 30 and allowing the front carriage bar 66 to return by gravity to starting position ready to move upwardly with the next succeeding ball.

As the balls pass into the drying chamber within hood plates 28 and 29, the respective rollers 40 leave the belt 43 and contact the stationary track 41, which causes the balls to continue rotating on their vertical axes during the drying cycle but at a slower speed than during the spraying cycle. If round balls of substantially different diameter are coated, the gun may be adjusted on the plate 74 radially of the ball to maintain the nozzle at substantially the same distance from the ball.

Figure 12:
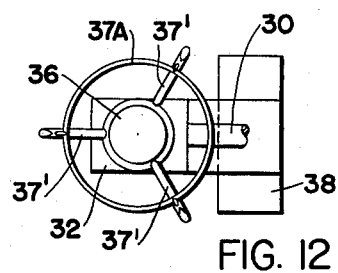
Fig. 12 is a plan sectional view as on line 12—12 of Fig. 15, showing the means for rotatively supporting a football.

In operating the improved machine to spray coat footballs as indicated in Figs. 15 and 16, the pivot 65 would be adjusted to the right on bar 66 to align it with the horizontal axis of curvature of football F, and the pivot 70 and length of link 67 adjusted to cause the gun to rotate through an arc nearer 180°, as indicated in Figs. 15 and 16, to make sure that the ends of the balls are completely spray coated. The fingers 37 would be replaced with fingers 37', extending upwardly from the disk 36 and atttached to a concentric ring 37A (Fig. 12) adapted to support the footballs F on end, and the balls would be placed on the fingers by hand.

The fingers 37' and the concentric ring 37A is adapted to pass through the ring 100 and allow the balls F to be caught on pins 101, after which the ring 100 is immediately tilted and the push plate 104 pushes the balls off the ring.

The improved machine provides for automatically spraying a coating uniformly over the surfaces of a series of balls without wasting coating material, and drying the coatings. The apparatus is adapted to spray coat balls of different sizes and shapes, and controls the path of a conventional spray gun to follow the contours of a variety of balls.

What is claimed is:

1. Apparatus for spray coating balls comprising an upright frame, an endless conveyor vertically movable on said frame, longitudinally spaced horizontal shafts journaled transversely of the conveyor, means to axially rotate said shafts, a set of upwardly directed fingers on the end of each shaft for rotatably supporting a ball in upright position for rotation on its vertical axis and having a uniform circumferential spacing at their upper ends less than the largest diameter of a ball, counterweighted gear means on each shaft for transmitting rotation of said shaft to said fingers, means movable with the conveyor for rotatably mounting a spray device for rotation concentric of each succeeding ball on an axis perpendicular to its axis of rotation, and means operated by the conveyor for successively dumping coated balls from each set of fingers.

2. Apparatus for spray coating balls comprising an upright frame, an endless conveyor vertically movable on said frame, longitudinally spaced horizontal shafts journaled transversely of the conveyor, means to axially rotate said shafts, a set of upwardly directed fingers on the end of each shaft for rotatably supporting a ball in upright position for rotation on its vertical axis and having a uniform circumferential spacing at their upper ends less than the largest diameter of a ball, counterweighted gear means on each shaft for transmitting rotation of said shaft to said fingers, means movable with the conveyor for rotatably mounting a spray device for rotation concentric of each succeeding ball on an axis perpendicular to its axis of rotation, means for adjusting the center of rotation of said spray device to conform to balls having various centers of curvature, and means operated by the conveyor for successively dumping coated balls from each set of fingers.

3. Apparatus for spray coating balls comprising, an endless conveyor having two vertical runs, longitudinally spaced horizontal shafts journaled transversely of the conveyor, means to axially rotate each shaft, vertically directed ball support means on the end of each shaft, means to transmit rotation of each shaft to said ball support means, means movable with the conveyor for pivotally mounting a spray device for rotation concentric of each ball support means on an axis perpendicular to said axis of rotation, means for moving said mounting means along with the conveyor for part of its vertical travel, means for returning said mounting means to its original position, and means operated by the conveyor for successively dumping coated balls from the conveyor.

4. Apparatus for spray coating balls comprising, an endless conveyor having two vertical runs, longitudinally spaced horizontal shafts journaled transversely of the conveyor, means to axially rotate each shaft, vertically directed ball support means on the end of each shaft, means movable with the conveyor for pivotally mounting a spray device for rotation concentric of each ball support means on an axis perpendicular to said axis of rotation, means for adjusting the center of rotation of said spray device to conform to balls having various centers of curvature, means for moving said mounting means along with the conveyor for part of its vertical travel, means for returning said mounting means to its original position, and means operated by the conveyor for successively dumping coated balls from the conveyor.

5. Apparatus for spray coating balls, comprising, an endless conveyor flight having two vertical runs, longitudinally spaced horizontal shafts journaled transversely of the conveyor, means to axially rotate each shaft, counterweighted gear means on the end of each shaft for transmitting rotation thereof, vertically directed ball support means connected with said gear means for rotation by said shaft, a delivery chute leading to the conveyor, means controlled by the conveyor for releasing the balls one at a time from the chute for rolling onto successive support means, means movable with the conveyor for rotatably mounting a spray device for rotation concentric of each succeeding ball support means on an axis perpendicular to said axis of rotation, and means operated by the conveyor for pushing successive coated balls off the conveyor.

6. Apparatus for spray coating balls comprising, an endless conveyor flight having two vertical runs, longitudinally spaced horizontal shafts journaled transversely of the conveyor, means to axially rotate each shaft, counterweighted gear means on the end of each shaft for transmitting rotation thereof, vertically directed ball support means connected with said gear means for rotation by said shaft, a delivery chute leading to the conveyor, means controlled by the conveyor for releasing the balls one at a time from the chute for rolling onto successive support means, means movable with the conveyor for rotatably mounting a spray device for rotation concentric of each succeeding ball support means on an axis perpendicular to said axis of rotation, means for adjusting the center of rotation of said spray device to conform to balls having various centers of curvature, and means operated by the conveyor for pushing successive coated balls off the conveyor.

7. Apparatus for spray coating balls comprising, a frame, an endless conveyor on said frame moving in parallel vertical flights, a plurality of transverse shafts rotatably journaled on said conveyor at spaced longitudinal intervals, at least one counterweighted gear box suspended on and driven by each shaft, a set of angularly divergent upwardly extending fingers mounted atop and rotated by each gear box on a vertical axis and having a uniform circumferential spacing at their upper ends less than the largest diameter of a ball, means on said frame for rotating each shaft and driving each gear box and rotating each set of fingers, delivery means on said frame on the upwardly moving side of said conveyor and operated thereby for successively depositing a ball on each set of fingers, means movable with the conveyor for rotatably mounting a spray device for rotation concentric of each succeeding ball on an axis perpendicular to its vertical axis of rotation, and dumping means on said frame on the downwardly moving side of said conveyor and operated thereby for successively removing a coated ball from each set of fingers.

8. In apparatus for spray coating balls, said apparatus having a frame, an endless conveyor on said frame moving in parallel vertical flights and means movable with the conveyor for rotatably mounting a spray device for rotation concentric of each succeeding ball on an axis perpendicular to its vertical axis of rotation, the improvement consisting of a plurality of transverse shafts rotatably journaled on said conveyor at spaced longitudinal intervals, at least one counterweighted gear box suspended on and driven by each shaft, a set of angularly divergent upwardly extending fingers mounted atop and rotated by each gear box on a vertical axis and having a uniform circumferential spacing at their upper ends less than the largest diameter of a ball, means on said frame for rotating each shaft and driving each gear box and rotating each set of fingers, delivery means on said frame on the upwardly moving side of said conveyor and operated thereby for successively depositing a ball on each set of fingers, and dumping means on said frame on the downwardly moving side of said conveyor and operated thereby for successively removing a coated ball from each set of fingers.

References Cited in the file of this patent

UNITED STATES PATENTS

| | | |
|---|---|---|
| 1,313,670 | Burdick | Aug. 19, 1919 |
| 1,347,256 | Davis | July 20, 1920 |
| 2,081,442 | Willshaw et al. | May 25, 1937 |
| 2,270,132 | Malloy et al. | Jan. 13, 1942 |
| 2,345,834 | Schweitzer | Apr. 4, 1944 |